United States Patent
Prukop

(10) Patent No.: US 9,127,547 B2
(45) Date of Patent: Sep. 8, 2015

(54) CHEMICAL DELIVERY APPARATUS, SYSTEM, AND METHOD FOR HYDROCARBON PRODUCTION

(75) Inventor: Gabriel Prukop, Katy, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 912 days.

(21) Appl. No.: 13/248,158

(22) Filed: Sep. 29, 2011

(65) Prior Publication Data

US 2012/0111569 A1 May 10, 2012

Related U.S. Application Data

(60) Provisional application No. 61/410,044, filed on Nov. 4, 2010.

(51) Int. Cl.
*E21B 43/40* (2006.01)
*E21B 43/16* (2006.01)
*B01D 17/02* (2006.01)

(52) U.S. Cl.
CPC ............ *E21B 43/40* (2013.01); *B01D 17/0202* (2013.01); *E21B 43/16* (2013.01)

(58) Field of Classification Search
CPC ..... E21B 33/068; E21B 43/121; E21B 43/16; E21B 43/25; E21B 43/34; E21B 43/385; E21B 43/40; E21B 37/06
USPC .............. 166/300, 310, 369, 90.1, 75.12
See application file for complete search history.

(56) References Cited

U.S. PATENT DOCUMENTS

| | | | |
|---|---|---|---|
| 2,884,067 A * | 4/1959 | Marken | 166/90.1 |
| 3,053,320 A * | 9/1962 | Steincamp | 166/68 |
| 3,211,225 A * | 10/1965 | Thiessen et al. | 166/90.1 |
| 3,223,167 A * | 12/1965 | Hampton | 166/90.1 |
| 4,102,394 A * | 7/1978 | Botts | 166/66 |
| 4,132,268 A | 1/1979 | Harrison | |
| 4,354,553 A * | 10/1982 | Hensley | 166/250.05 |
| 4,506,735 A * | 3/1985 | Chaudot | 166/357 |
| 4,681,167 A * | 7/1987 | Soderberg | 166/371 |
| 4,896,725 A * | 1/1990 | Parker et al. | 166/267 |
| 5,002,657 A * | 3/1991 | Botts | 210/115 |
| 5,343,941 A * | 9/1994 | Raybon | 166/53 |
| 6,343,653 B1 | 2/2002 | Mason | |
| 6,648,072 B1 | 11/2003 | Blanchard | |
| 8,366,808 B2 * | 2/2013 | Wolz et al. | 95/248 |
| 8,663,368 B2 * | 3/2014 | Wolz et al. | 95/248 |
| 2004/0168811 A1 | 9/2004 | Shaw et al. | |
| 2008/0237141 A1 * | 10/2008 | Kerfoot | 210/739 |
| 2013/0048276 A1 * | 2/2013 | Elliott | 166/267 |

OTHER PUBLICATIONS

PCT International Search Report and Written Opinion of the International Searching Authority, PCT/US2011/053846, Feb. 23, 2012.

* cited by examiner

*Primary Examiner* — Elizabeth Gitlin

(57) ABSTRACT

A chemical distribution device includes mixing manifold that receives well treatment chemicals and solvent that are to be mixed. A siphon is positioned within the mixing manifold to control the fluid level. The mixture is not delivered from the chemical distribution device until the fluid level of the mixture is above a crest of the siphon. The mixture is delivered in a batch to the well via a flowline until the fluid level of the mixture is below the inlet of the siphon.

20 Claims, 4 Drawing Sheets

CHEMICAL DELIVERY APPARATUS, SYSTEM, AND METHOD FOR HYDROCARBON PRODUCTION

RELATED APPLICATIONS

This application is related to and claims priority to U.S. provisional application No. 61/410,044, filed on Nov. 4, 2010.

TECHNICAL FIELD

This invention relates to hydrocarbon production, and more particularly, to such a system, apparatus, and method for delivering chemicals into a production well.

BACKGROUND

It is often useful in hydrocarbon production to deliver chemicals into the well assembly for well treatment. Such well treatment chemicals can, for example, be useful in reducing corrosion, reducing the formation of scale, reducing the formation of emulsions, or a combination thereof. Over the years, there have been various ways of delivering such well treatment chemicals. In some situations, these chemicals are simply delivered down an annulus of the well.

While this method is simple and direct, when the well is deep, hot, or a combination thereof, sometimes the well treatment chemicals fail to reach the desired locations at the bottom portion of the well. This is sometimes caused by the mere contact of the chemicals with the casing walls of the well when the well treatment chemicals are traveling downward. Such contact can reduce the well treatment chemical solvent and cause the active chemical to collect on the casing walls. Additionally, when the well is hot, the active chemical can begin to decompose as some of the well treatment chemical solvent evaporates or remains on the casing walls.

Previous attempts to solve this have included using a container that collects the well treatment chemicals with another fluid or solvent. The container is rotatably mounted upon an axle that is off center such that when the fluid reaches a predetermined level, the container tips and discharges its contents. The container then must be repositioned to start collecting the well treatment chemicals again.

DETAILED DESCRIPTION

Figure 1:
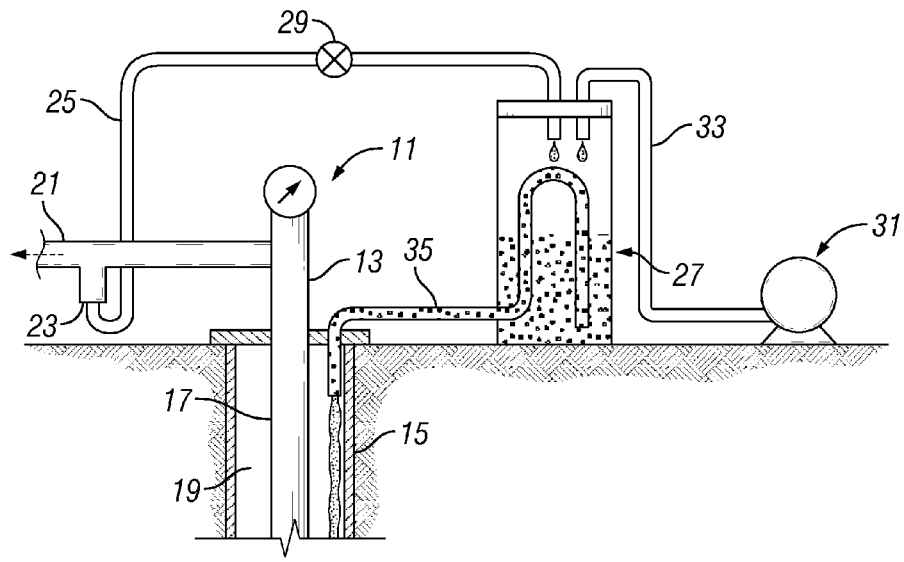
FIG. 1 is an environmental view of a production well and a chemical distribution assembly in accordance with an embodiment of the present invention.

Referring to FIG. 1, production well 11 is illustrated at the surface of an oil field. Production well 11 comprises wellhead 13 that is mounted to a wellhead housing or outer casing 15. Production string 17 extends downward within outer casing 15 and is in fluid communication with a producing zone of a reservoir. Production string 17 is in fluid communication with wellhead 13. As will be readily appreciated by those skilled in the art, production string 17 can be an inner string of casing or a string of tubing. In a typical well assembly, a plurality of casing strings are hung and cemented in place between outer casing 15 and production string 17.

For simplicity sake, such additional strings of casing are not shown in FIG. 1, and FIG. 1 merely illustrates production string 17 within outer casing 15. Production annulus 19 is formed in the area surrounding production string 17. Production annulus 19 has an outer, radial boundary defined by the string of casing that production string 17 is carried within. In the embodiment shown in FIG. 1, such an outer boundary is defined by outer casing 15, but it could easily be defined by an intermediate string of casing positioned between production string 17 and outer casing 15 when another string is present.

Production string 17 receives produced fluids from the reservoir and carries the produced fluids to wellhead 13 at the surface. Typically, the produced fluids can include oil, gas, and brine (typically water with high concentrations of dissolved salts) from the reservoir. Production flowline 21 receives the produced fluids from wellhead 13 for communicating the produced fluids to a gathering station or collection manifold (not shown). Separator 23 is positioned between wellhead 13 and the gathering station in order to separate some of the produced water or brine from the produced fluids. Separator 23 is preferably a conventional separator for separating brine from the produced fluids.

Brine flowline 25 carries brine separated from the produced fluids to a chemical distribution device 27. In an embodiment of this disclosure, valve 29 is positioned in flowline 25 to control the amount of brine delivered to chemical distribution device 27. Accordingly, valve 29 controls the flow of brine from separator 23. If less brine is allowed through valve 29 than is separated from the produced fluids by separator 23, the extra brine can be discharged to a separate flowline (not shown) or flow through production flowline 21 to the gathering station.

Chemical source 31 provides well treatment chemicals to be delivered into well 11. For example, chemical source 31 can be a chemical tank and pump assembly. Chemical flowline 33 carries the well treatment chemicals from chemical source 31 to chemical distribution device 27. Chemical source 31 can control the amount of chemicals received by chemical distribution device 27 in a conventional manner, such a fluid drip through a low flow rate valve.

The brine separated from the produced fluids and the well treatment chemicals are received by chemical distribution device 27, and are mixed prior to delivery to well 11. Chemical line 35 communicates the mixture of brine and chemicals to production annulus 19 of well 11. Mixing of the chemicals with the brine can help mitigate against the chemicals not reaching the desired location within well 11, such as through decomposing due to heat or through collection on the surface of components within well 11. As will be readily appreciated by those skilled in the art, many wellheads are available that communicate with production annulus 19, and if such a wellhead is utilized, chemical line 35 would connect to the wellhead to communicate with production annulus 19. Furthermore, capillary lines (not shown) can be used to deliver the mixture of brine and chemicals downhole, such as through isolation devices or packer assemblies.

Figure 2:
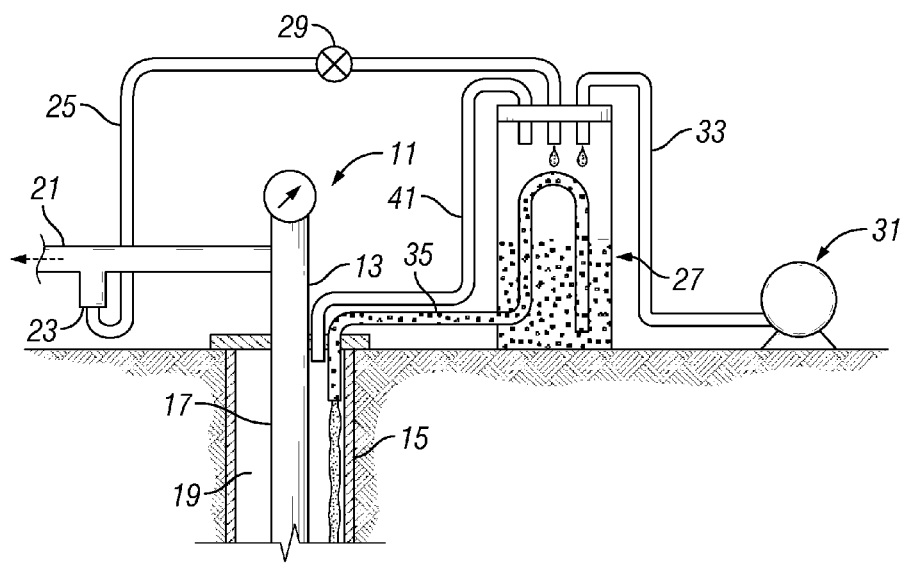
FIG. 2 is an environmental view of a production well and a chemical distribution assembly in accordance with an embodiment of the present invention.

Referring to FIG. 2, production well 11 and chemical distribution device 27 are illustrated at the surface of an oil field similar to FIG. 1. In this embodiment, vent line 41 is utilized to equalize pressure between production annulus 19 of well 11 and chemical distribution device 27. By equalizing the pressures between production annulus 19 and chemical distribution device 27, mixture M does not need to overcome a pressure differential to flow through chemical line 35. However, the well treatment chemicals delivered from chemical source 31 and the brine delivered from brine flowline 25 should be pressurized above the pressure in chemical distribution device 27.

Figure 3:
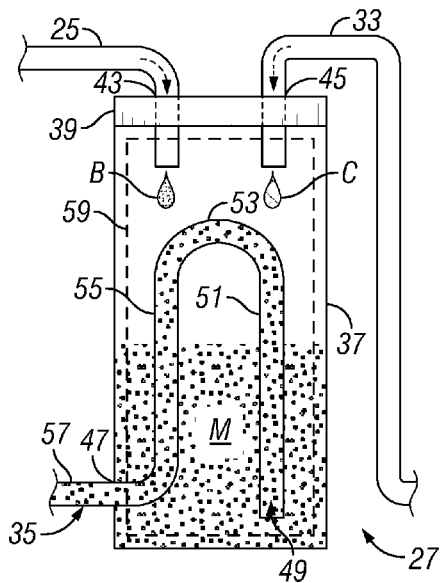
FIG. 3 is a schematic, sectional view of a chemical distribution device in accordance with an embodiment of the present invention.

Referring to FIG. 3, an embodiment of chemical distribution device 27 is provided in more detail. Chemical distribution device 27 includes mixing manifold 37 which receives brine B and well treatment chemicals C from flowlines 25,33 respectively. Brine B and well treatment chemicals C collect within mixing manifold 37 where the fluids mix to form mixture M. Chemical distribution device 27 can include cover 39 that closes the top of mixing manifold 37 to advantageously prevent contaminants from being received by mixing manifold 37. Openings 43,45 provide for fluid communication between flowlines 25,33 and the interior of mixing manifold 37. In a preferred embodiment, flowlines 25,33 sealingly engage openings 43,45. Such sealing engagement can be through a flange connection, or if flowlines 25,33 extend into chemical distribution device 27 as shown in FIG. 3, the sealing engagement can be the outer surface of flowlines 25,33 with the inner surface of openings 43,45.

Opening 47 can be formed in a sidewall of mixing manifold 37. Chemical line 35 comprises inlet 49 positioned in a lower portion of mixing manifold 37 for receiving mixture M to be communicated to production annulus 19. Chemical line 35 comprises upfill portion 51 extending upward within mixing manifold 37 to crest portion 53. Crest portion 53 is in fluid communication with downfill portion 55 of chemical line 35 that extends downward within mixing manifold 37 to opening 47. Chemical line 35 also includes delivery portion 57 in fluid communication with downfill portion 55. Delivery portion 57 carries mixture M from opening 47 to production annulus 19 of well 11.

Siphon 59 is formed by the combination of upfill, crest, and downfill portions 51,53,55 of chemical line 35 within chemical distribution device 27. As will be readily appreciated by those skilled in the art, chemical line 35 can be one tubular member as shown in FIG. 3. Alternatively, chemical line 35 can include a first tubular member for siphon 59 and a second tubular member for delivery portion 57 connecting to siphon 59 at opening 47. Such a connection can be with a conventional flange assembly.

Figure 4:
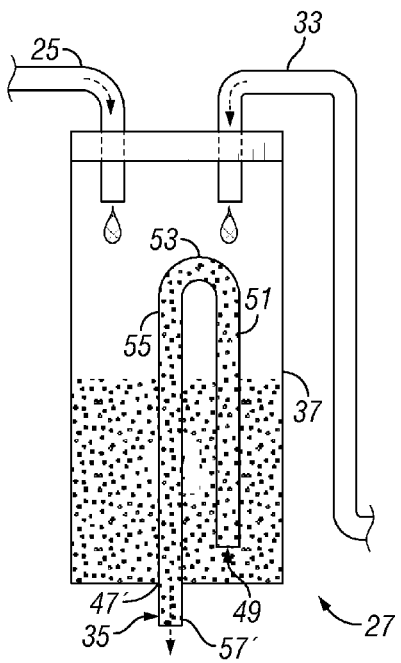
FIG. 4 is a schematic, sectional view of a chemical distribution device in accordance with an embodiment of the present invention.

Referring to FIG. 4, an embodiment of chemical distribution device 27 is shown where opening 47' is formed in the bottom of mixing manifold 37. Chemical line 35 comprises an inlet 49 positioned in a lower portion of mixing manifold 37 for receiving mixture M to be communicated to production annulus 19. Chemical line 35 comprises upfill portion 51 extending upward within mixing manifold 37 to crest portion 53. Crest portion 53 is in fluid communication with downfill portion 55 of chemical line 35 that extends downward within mixing manifold 37 to opening 47'. Chemical line 35 also includes delivery portion 57' in fluid communication with downfill portion 55. Delivery portion 57' carries mixture M from opening 47' to production annulus 19 of well 11.

Figure 5:
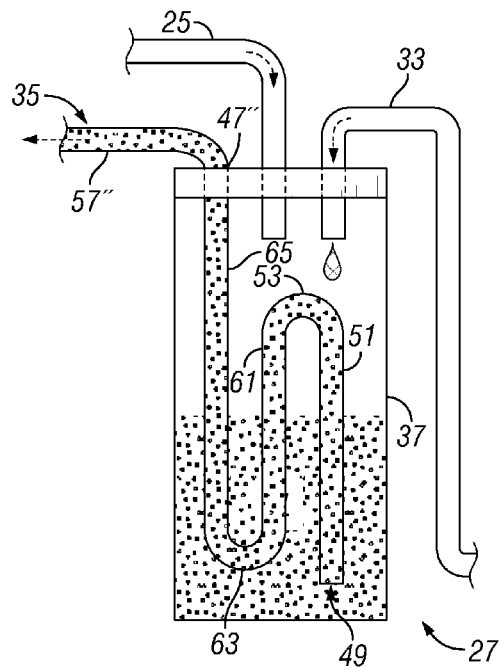
FIG. 5 is a schematic, sectional view of a chemical distribution device in accordance with an embodiment of the present invention.

Referring to FIG. 5, an embodiment of chemical distribution device 27 is shown where opening 47" is formed in the top of mixing manifold 37. Chemical line 35 comprises an inlet 49 positioned in a lower portion of mixing manifold 37 for receiving mixture M. Chemical line 35 further comprises upfill portion 51 extending upward within mixing manifold 37 to crest portion 53. Crest portion 53 is in fluid communication with downfill portion 61 of chemical line 35. Downfill portion 61 extends downward within mixing manifold 37 to a lower bend 63 that then extends upward into second upfill portion 65 to opening 47". Chemical line 35 is arranged in mixing manifold 37 such that fluid reaching crest portion 53 flows through portions 61,63,65 to exit opening 47", thus entering delivery portion 57" for delivery of mixture M to production annulus 19 of well 11. In particular, the momentum of mixture M produced from downfill portion 61 is great enough such that fluid from crest portion 53 flows through opening 47" to delivery portion 57" in chemical line 35. While not shown in FIG. 5, delivery portion 57" should extend below crest portion 53 within a predetermined distance after exiting opening 47" such that a siphoning effect is produced. Accordingly, in this embodiment, siphon 59 is formed by the combination of upfill, crest, downfill, lower bend, and second upfill portions 51,53,61,63,65 of chemical line 35 within chemical distribution device 27.

While not shown in FIGS. 3-5, it will be apparent to one skilled in the art that the design of mixing manifold 37 of chemical distribution device 27 can be modified to further induce mixing of brine B and well treatment chemicals C prior to siphoning. For example, mixing manifold 37 could incorporate impinging plates or inline mixing devices to further mix brine B and well treatment chemicals C. In one or more embodiments, brine B and well treatment chemicals C are mixed upstream of mixing manifold 37 and delivered to mixing manifold 37 through a single flow line.

Figure 6:
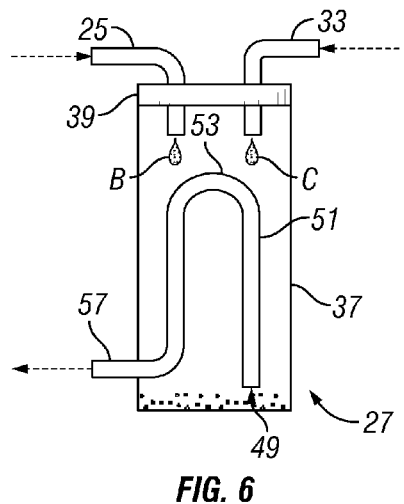
FIG. 6 is a sectional view of the chemical distribution device of FIG. 3, wherein the fluid level is below the inlet of the chemical line.
Figure 7:
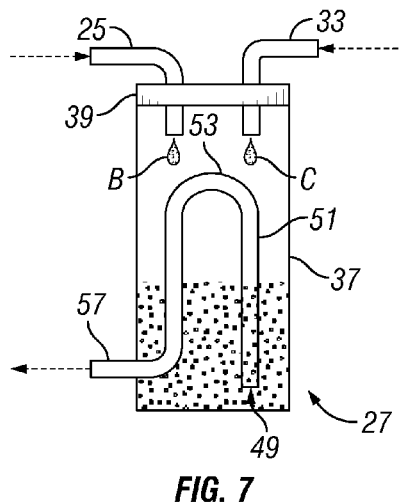
FIG. 7 is a sectional view of the chemical distribution device of FIG. 3, wherein the fluid level is above the inlet of the chemical line and below the crest in the chemical line.
Figure 8:
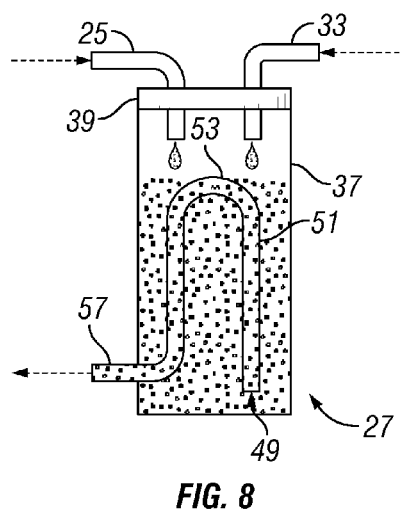
FIG. 8 is a sectional view of the chemical distribution device of FIG. 3, wherein the fluid level is above the crest of the chemical line.

Referring to FIGS. 6-9, in operation, brine B and chemicals C are received by mixing manifold 37. As shown in FIG. 6, brine B and chemicals C collect and mix in the lower portion of mixing manifold 37 below inlet 49 of chemical line 35. As the level of mixture M rises to a level above inlet 49 (FIG. 7), mixture M communicates through inlet 49 through upfill portion 51. When the level of mixture M reaches a vertical position above crest portion 53 (FIG. 8), mixture M within upfill portion 51 communicates through crest portion 53 to downfill portion 55. Mixture M is then carried within delivery portion 57 to production annulus 19 for chemical treatment of well 11. Flow of mixture M continues as the level of mixture M within mixing manifold 37 declines (FIG. 9), until the level of mixture M is below the elevation of inlet 49. This process then repeats.

Figure 10:
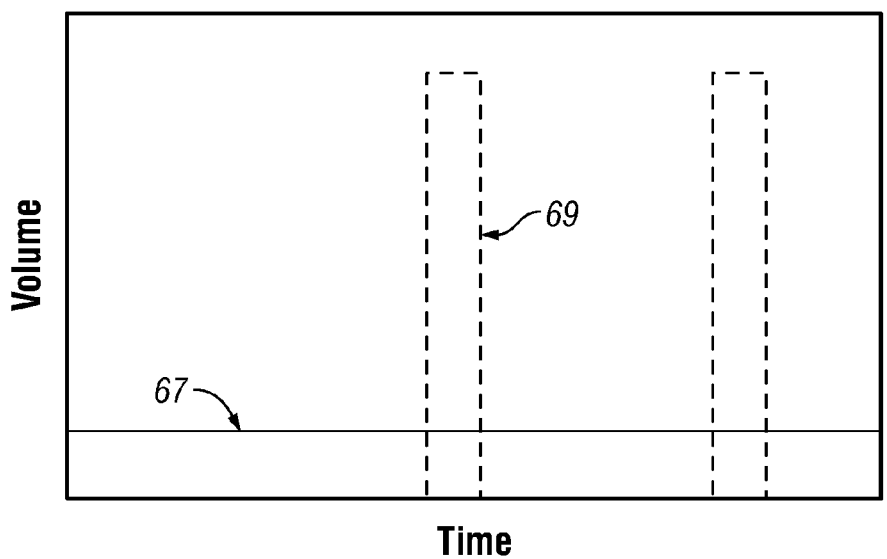
FIG. 10 is a graph showing the volume of fluid received and delivered by the chemical distribution device of FIG. 3 versus time.

As can be seen by FIG. 10, chemical distribution device 27 delivers mixture M in a series of repeating batches due to the combination of the slow-delivery rates of brine B and chemicals C, and the siphon-effect of siphon 59. This advantageously helps to provide mixture M in a batch that mitigates against the decomposition of the well treatment chemicals in well 11 prior to chemicals C reaching the desired location. Additionally, batch delivery also advantageously helps to prevent chemicals C from collecting within the well prior to reaching the desired location because they are carried with brine B. Finally, delivering chemicals C in mixture M helps mix chemicals C into the produced fluids, thus preventing chemicals C from simply collecting on the surface of the produced fluids.

Figure 9:
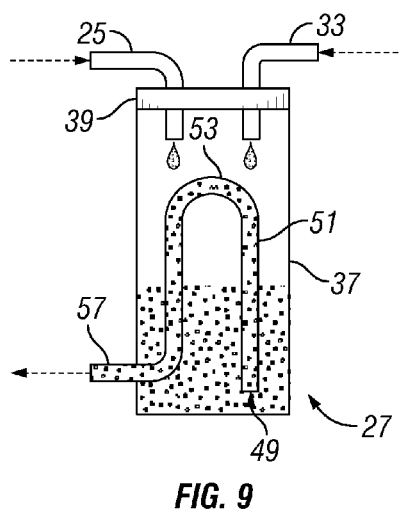
FIG. 9 is a sectional view of the chemical distribution device of FIG. 3, wherein the fluid is being delivered by the chemical line and the fluid level is decreasing.

While the flow rates of brine B and chemicals C are shown as being constant and continuous in FIG. 9 by solid line 67, in some embodiments, the flow rates vary and/or are intermittent. Furthermore, the volumes delivered in each batch of mixture M as shown by dashed line 69, as well as the time between repeating batches, can be varied based on the size of the mixing tank and the arrangement of the siphon 59 therewithin.

Chemical distribution device 27 also advantageously delivers mixture M in batches without the use of any moving parts. This helps to prevent failures and minimizes maintenance requirements. Unlike prior assemblies, there is also not a need to manually or mechanically reset chemical distribution device 27. As will be readily appreciated by those skilled in the art, this also advantageously reduces operational resources.

While the invention has been shown in only some of its forms, it should be apparent to those skilled in the art that it is not so limited, but susceptible to various changes without departing from the scope of the invention. In addition to several examples of modifications and alternatives provided herein, chemicals C could be mixed with water, salt water, or solvent collected from the surface rather than brine B separated from the produced fluids. Additionally, the upfill and downfill portions of the siphon can be twisted around each other in a helical manner to increase the volume carried within the siphon prior to fluid flow delivery. Furthermore, chemical distribution device can be utilized for delivering chemicals in other systems such as pipelines or injection wells.

The invention claimed is:

1. An apparatus for delivering chemicals to a hydrocarbon well producing a produced fluid from a reservoir, the apparatus comprising:
    a chemical source configured to provide a well treatment chemical;
    a manifold configured to receive the produced fluid from the well and the chemical from the chemical source and communicate a mixture of the produced fluid and the chemical to a production annulus of the well;
    a chemical line inside the manifold and configured to deliver the mixture to the production annulus of the well, wherein the chemical line comprises an inlet inside the manifold for receiving the mixture, an upfill portion inside the manifold extending upward from the inlet to a crest portion inside the manifold, and a downfill portion inside the manifold extending downward in the manifold from the crest portion, such that the upfill, crest, and downfill portions in combination form a continuous tubular siphon inside the manifold; and
    a vent line with an opening in the production annulus of the well and an opening above the crest portion of the chemical line inside the manifold, the vent line connecting the production annulus of the well and the manifold and configured to equalize pressures therebetween such that the mixture is delivered to the production annulus of the well when a level of the mixture in the manifold rises to the crest portion and delivery of the mixture ceases when the level of the mixture falls below the inlet.

2. The apparatus according to claim 1, further comprising a separator configured to receive at least a portion of the flow of the produced fluid from the well, separate a liquid from the produced fluid, and deliver the liquid for mixing with the chemical to form the mixture.

3. The apparatus according to claim 1, wherein the chemical source comprises a chemical tank and a pump.

4. The apparatus according to claim 1, wherein the manifold is configured to receive the well treatment chemical and the produced fluid separately and mix the produced fluid and the chemical to form the mixture.

5. The apparatus according to claim 1, wherein the manifold is configured to receive the production fluid via a first flowline that receives a portion of the produced fluid from the well and the manifold is configured to receive the chemical via a second flowline that connects the manifold to the chemical source.

6. The apparatus according to claim 5, further comprising a valve positioned in the first flowline to control an amount of production fluid delivered to the manifold.

7. The apparatus according to claim 1, wherein the apparatus is configured to cyclically begin delivery of the mixture when the level of the mixture in the manifold rises to the crest portion and cease delivery of the mixture when the level of the mixture falls below the inlet, such that the mixture is delivered to the well in a series of batches.

8. The apparatus according to claim 1, wherein the well treatment chemical and the produced fluid are pressurized above a pressure in the manifold.

9. The apparatus according to claim 1, further comprising a delivery portion in fluid communication with the downfill portion to carry the mixture to the production annulus of the well.

10. The apparatus according to claim 1, wherein the chemical line connects to a wellhead to communicate with the production annulus.

11. The apparatus according to claim 1, wherein the manifold includes impinging plates or inline mixing devices to mix the produced water and the chemical.

12. A system for delivering chemicals to a hydrocarbon well producing a produced fluid from a reservoir, the system comprising:
    the hydrocarbon well having a production string for producing the produced fluid and a casing surrounding the production string, such that the casing and production string define a production annulus therebetween;
    a wellhead configured to deliver produced fluids from the production string to a production flowline; and
    the apparatus according to claim 1, wherein the wellhead is configured to deliver the mixture of the produced fluid and the chemical from the manifold to the production annulus.

13. A method of delivering chemicals to a hydrocarbon well producing a produced fluid from a reservoir, the method comprising:
    receiving a produced fluid from the well in a manifold;
    receiving a well treatment chemical from a chemical source in the manifold;
    providing a vent line with an opening in a production annulus of the well and an opening above a crest portion of a chemical line inside the manifold, the vent line connecting the production annulus of the well and the manifold and equalizing pressures therebetween;
    mixing the well treatment chemical with the produced fluid in the manifold to form a mixture therefrom, wherein the mixture is circulated through the chemical line inside the manifold, the chemical line comprising an inlet inside the manifold for receiving the mixture, an upfill portion inside the manifold extending upward from the inlet to the crest portion inside the manifold, and a downfill portion inside the manifold extending downward in the manifold from the crest portion, such that the upfill, crest, and downfill portions in combination form a continuous tubular siphon inside the manifold; and delivering the mixture of the produced fluid and the chemical from the manifold to the production annulus of the well, wherein the mixture is carried to the production annulus when the level of mixture in the manifold reaches a vertical position above the crest portion and continues until the level of mixture within the manifold declines until the level of the mixture is below the elevation of the inlet.

14. The method according to claim 13, wherein the receiving step comprises separating at least a portion of a liquid present in the produced fluid flowing from the well, and wherein the mixing step comprises mixing the liquid with the chemical to form the mixture.

15. The method according to claim 13, wherein the mixing step comprises receiving the produced fluid and the chemical separately in the manifold and mixing the produced fluid and the chemical to form the mixture in the manifold.

16. The method according to claim 13, wherein delivering the mixture comprises delivering the mixture through the chemical line disposed in the manifold that holds the mixture such that the mixture flows into the inlet of the chemical line, upward through the upfill portion of the chemical line, and then downward through the downfill portion of the chemical line.

17. The method according to claim 13, wherein delivering the mixture comprises cyclically beginning delivery of the mixture when the level of the mixture in the manifold rises to the crest portion and ceasing delivery of the mixture when the level of the mixture falls below the inlet, such that the mixture is delivered to the well in a series of batches.

18. The method according to claim 13, wherein a delivery portion in fluid communication with the downfill portion carries the mixture to the production annulus of the well.

19. The method according to claim 13, wherein the well treatment chemical and the produced fluid are pressurized above a pressure in the manifold.

20. The method according to claim 13, wherein the chemical line connects to a wellhead to communicate with the production annulus.

* * * * *